United States Patent
Park

(10) Patent No.: US 8,089,576 B2
(45) Date of Patent: Jan. 3, 2012

(54) LIQUID CRYSTAL DISPLAY MODULE COMPRISING A BACKLIGHT UNIT HAVING AT LEAST ONE GUIDE TERMINAL INSERTED THROUGH AT LEAST ONE THROUGH HOLE OF THE MAIN FRAME AND METHOD OF FABRICATING THE SAME

(75) Inventor: Jae-Sung Park, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 363 days.

(21) Appl. No.: 12/128,987

(22) Filed: May 29, 2008

(65) Prior Publication Data

US 2008/0297682 A1 Dec. 4, 2008

(30) Foreign Application Priority Data

May 31, 2007 (KR) .................. 10-2007-0053060

(51) Int. Cl.
*G02F 1/1333* (2006.01)
*G02F 1/335* (2006.01)
*H04N 5/64* (2006.01)

(52) U.S. Cl. .............. 349/58; 349/67; 348/794

(58) Field of Classification Search .......... 349/67, 349/58, 59, 60; 348/794
See application file for complete search history.

(56) References Cited

U.S. PATENT DOCUMENTS

| | | | |
|---|---|---|---|
| 6,452,649 B1* | 9/2002 | Ono et al. ............. | 349/61 |
| 2001/0035923 A1* | 11/2001 | Cha et al. ............. | 349/65 |
| 2002/0080298 A1* | 6/2002 | Fukayama ............ | 349/58 |
| 2003/0063230 A1* | 4/2003 | Kato et al. ............ | 349/58 |
| 2004/0041961 A1* | 3/2004 | Lee ....................... | 349/58 |
| 2004/0085491 A1* | 5/2004 | Ogawa et al. ........ | 349/58 |
| 2005/0018102 A1* | 1/2005 | Hirano ................. | 349/58 |
| 2005/0088600 A1* | 4/2005 | Mizoguchi ........... | 349/141 |
| 2006/0038933 A1* | 2/2006 | Hashimoto ........... | 349/58 |
| 2006/0114367 A1* | 6/2006 | Aramatsu et al. .... | 349/58 |
| 2007/0085943 A1* | 4/2007 | Kang et al. .......... | 349/65 |

FOREIGN PATENT DOCUMENTS

CN 1949055 A 4/2007

OTHER PUBLICATIONS

Office Action issued in corresponding Chinese Patent Application No. 200810098345.X; mailed Jul. 24, 2009.

* cited by examiner

*Primary Examiner* — Mark Robinson
*Assistant Examiner* — Dennis Y Kim
(74) *Attorney, Agent, or Firm* — Brinks Hofer Gilson & Lione

(57) ABSTRACT

A liquid crystal display module includes: a liquid crystal display panel; a backlight unit under the liquid crystal display panel, the backlight unit having at least one guide terminal facing side surfaces of the liquid crystal display panel; a main frame supporting the liquid crystal display panel and the backlight unit; a bottom frame combined with the main frame to surround the backlight unit; and a top frame combined with the main frame to cover upper edge portions of the liquid crystal display panel.

15 Claims, 3 Drawing Sheets

LIQUID CRYSTAL DISPLAY MODULE COMPRISING A BACKLIGHT UNIT HAVING AT LEAST ONE GUIDE TERMINAL INSERTED THROUGH AT LEAST ONE THROUGH HOLE OF THE MAIN FRAME AND METHOD OF FABRICATING THE SAME

This application claims the benefit of Korean Patent Application No. 2007-0053060, filed on May 31, 2007, which is hereby incorporated by reference in its entirety.

TECHNICAL FIELD

The present application relates to a liquid crystal display device, and more particularly, to a liquid crystal display module including a supporting means for a liquid crystal display panel and a method of fabricating the liquid crystal display module.

BACKGROUND

Liquid crystal display (LCD) devices use the optical anisotropy and polarization properties of liquid crystal molecules of a liquid crystal layer to produce an image. The liquid crystal molecules have long and thin shapes, and because of the optical anisotropy property, the polarization of light varies with the alignment direction of the liquid crystal molecules. The alignment direction of the liquid crystal molecules can be controlled by varying the intensity of an electric field applied to the liquid crystal layer. Accordingly, a LCD device includes two substrates spaced apart and facing each other and a liquid crystal layer interposed between the two substrates. Each of the two substrates includes an electrode on a surface facing the other of the two substrates. A voltage is applied to each electrode to induce an electric field between the electrodes and the alignment of the liquid crystal molecules as well as the transmittance of light through the liquid crystal layer is controlled by varying the intensity of the electric field.

Because an LCD device does not include an emissive element, an additional light source is required to view images on the liquid crystal display panel. Accordingly, a backlight unit having a light source is disposed under the liquid crystal display panel. The backlight unit for an LCD device may be classified as either a side light type or a direct type according to the position of the light source relative to the liquid crystal display panel. In a side light type backlight unit, light emitted from at least one side portion of the liquid crystal display panel is redirected by a light guide plate (LGP) to enter the liquid crystal display panel. In a direct type backlight unit, a plurality of light sources is disposed at a rear surface of the liquid crystal display panel so that light from the plurality of light sources directly enters the liquid crystal display panel.

A side light type backlight unit has an advantage in fabrication process to a direct type backlight unit. A cold cathode fluorescent lamp (CCFL), an external electrode fluorescent lamp (EEFL) and a light emitting diode (LED) have been used as a light source of a backlight unit for an LCD device. The liquid crystal display panel and the backlight unit are integrated as a liquid crystal display module using various mechanical elements for protection from external impact and prevention of light leakage.

FIG. 1 is a cross-sectional view showing a liquid crystal display module including a side type backlight unit according to the related art. In FIG. 1, a liquid crystal display module includes a liquid crystal display panel 10, a backlight unit 20, a main frame 30, a top frame 40 and a bottom frame 50. The liquid crystal display panel 10 includes first and second substrates 6 and 4 facing each other and a liquid crystal layer (not shown) between the first and second substrates 6 and 4. Although not shown in FIG. 1, a thin film transistor as a switching element is formed on the first substrate 6, and a color filter layer is formed on the second substrate 4. The liquid crystal display panel displays images according to ON/OFF operation of the thin film transistor. In addition, a gate driving unit and a data driving unit are formed at sides of the liquid crystal display panel 10 as a tape carrier package (TCP) type. The gate driving unit and a data driving unit supply a gate signal and a data signal, respectively, to the liquid crystal display panel. To obtain a space for bonding the gate driving unit and the data driving unit, the first substrate 6 has a larger size than the second substrate 4 such that a first side portion "a" of the first substrate 6 is exposed and an opposite second side portion "b" is covered with the second substrate 4.

The backlight unit 20 that supplies light to the liquid crystal panel 10 is disposed under the liquid crystal display panel 10. The backlight unit 20 includes a fluorescent lamp (not shown) as a light source, a light guide plate 24, a reflecting sheet 26 and a plurality of optical sheets 22. The light guide plate 24 is disposed to face the fluorescent lamp. In addition, the reflecting sheet 26 is disposed under the fluorescent lamp and the light guide plate 24 and the plurality optical sheets 22 are sequentially disposed over the fluorescent lamp and the light guide plate 24.

The main frame 30 has a rectangular ring shape and is formed through a metal press. A plurality of first panel guides 32 and a plurality of second panel guides 34 upwardly protrude to support the liquid crystal display panel 10. As a result, movement of the liquid crystal display panel 10 is prevented.

The top frame 40 covers upper edge portions of the liquid crystal display panel 10 and outer side surfaces of the main frame 30 to protect and support sides of the liquid crystal display panel 10 and the main frame 30.

The bottom frame 50 covers a rear surface of the reflecting sheet 26 and inner side surfaces of the main frame 30. The bottom frame 50 is combined with the main frame 30 and the top frame 40 using a connecting means (not shown) to form the liquid crystal display module.

The above-mentioned structure is applied to a medium-sized model of an LCD device. To support the liquid crystal display panel 10 having a relatively heavy weight, the main frame 30, the plurality of first panel guides 32 and the plurality of second panel guides 34 are formed of a metallic material.

An LCD device may have one of a twisted nematic (TN) mode and an in-plane switching (IPS) mode. When the LCD device has an IPS mode, a transparent conductive layer 5 having indium-tin-oxide (ITO) is formed between the first and second substrates 6 and 4. Since the transparent conductive layer 5 is disposed at edge portions of the first and second substrates 6 and 4, the transparent conductive layer 5 is exposed to the exterior of the liquid crystal display panel 10. The exposed transparent conductive layer 5 may be connected to the second panel guide 34 to cause an electric shortage. Accordingly, the second panel guide 34 at the second side portion "b" is bent under the first substrate 6 to prevent the electric shortage between the second panel guide 34 and the exposed transparent conductive layer 5, while the first panel guide 32 at the first side portion "a" having the gate driving unit and the data driving unit upwardly protrudes to a top surface of the second substrate 4. As a result, the second panel guide 34 supports the first substrate 6.

FIG. 2 is a perspective view showing a main frame of a liquid crystal display module according to the related art. In FIG. 2, first and second panel guides 32 and 34 upwardly protrude from a main frame 30 combining with a bottom frame 50 (of FIG. 1). The second panel guide 34 has at least one embossed portion. Since the first panel guide 32 straightly extends and the second panel guide 34 is bent, the first panel guide 32 is higher than the second panel guide 34. Accordingly, although the first panel guide 32 supports a side surface of a liquid crystal display panel 10 (of FIG. 1), the second panel guide 34 does not support the side surface of the liquid crystal display panel 10 (of FIG. 1). As a result, the liquid crystal display panel 10 (of FIG. 1) may be detached by impact or movement during conveyance or transference to be broken.

Referring again to FIG. 1, the liquid crystal display panel 10 is attached to the main frame 30 using a double-sided adhesive tape 38 to prevent the above-mentioned detachment. However, since an attachment step using the double-sided adhesive tape and an alignment step between the liquid crystal display panel 10 and the main frame 30 are added to a fabrication process for the liquid crystal display module, the fabrication process for the liquid crystal display module is complicated. In addition, production cost increases due to the double-sided adhesive tape.

SUMMARY

A liquid crystal display module includes: a liquid crystal display panel; a backlight unit under the liquid crystal display panel, the backlight unit having at least one guide terminal facing side surfaces of the liquid crystal display panel; a main frame supporting the liquid crystal display panel and the backlight unit; a bottom frame combined with the main frame to surround the backlight unit; and a top frame combined with the main frame to cover upper edge portions of the liquid crystal display panel.

In another aspect, a method of fabricating a liquid crystal display module includes: disposing a backlight unit having at least one guide terminal over a bottom frame; disposing a main frame over the backlight unit; disposing a liquid crystal display panel over the main frame such that the at least one guide terminal faces side surfaces of the liquid crystal panel; disposing a top frame over the liquid crystal display panel; and combining the bottom frame, the main frame and the top frame to support the liquid crystal panel and the backlight unit.

BRIEF DESCRIPTION OF THE DRAWINGS

The accompanying drawings, which are included to provide a further understanding of the invention and are incorporated in and constitute a part of this specification, illustrate embodiments of the invention.

DETAILED DESCRIPTION OF THE EMBODIMENTS

Reference will now be made in detail to embodiments which are illustrated in the accompanying drawings. Wherever possible, similar reference numbers will be used to refer to the same or similar parts.

Figure 3:
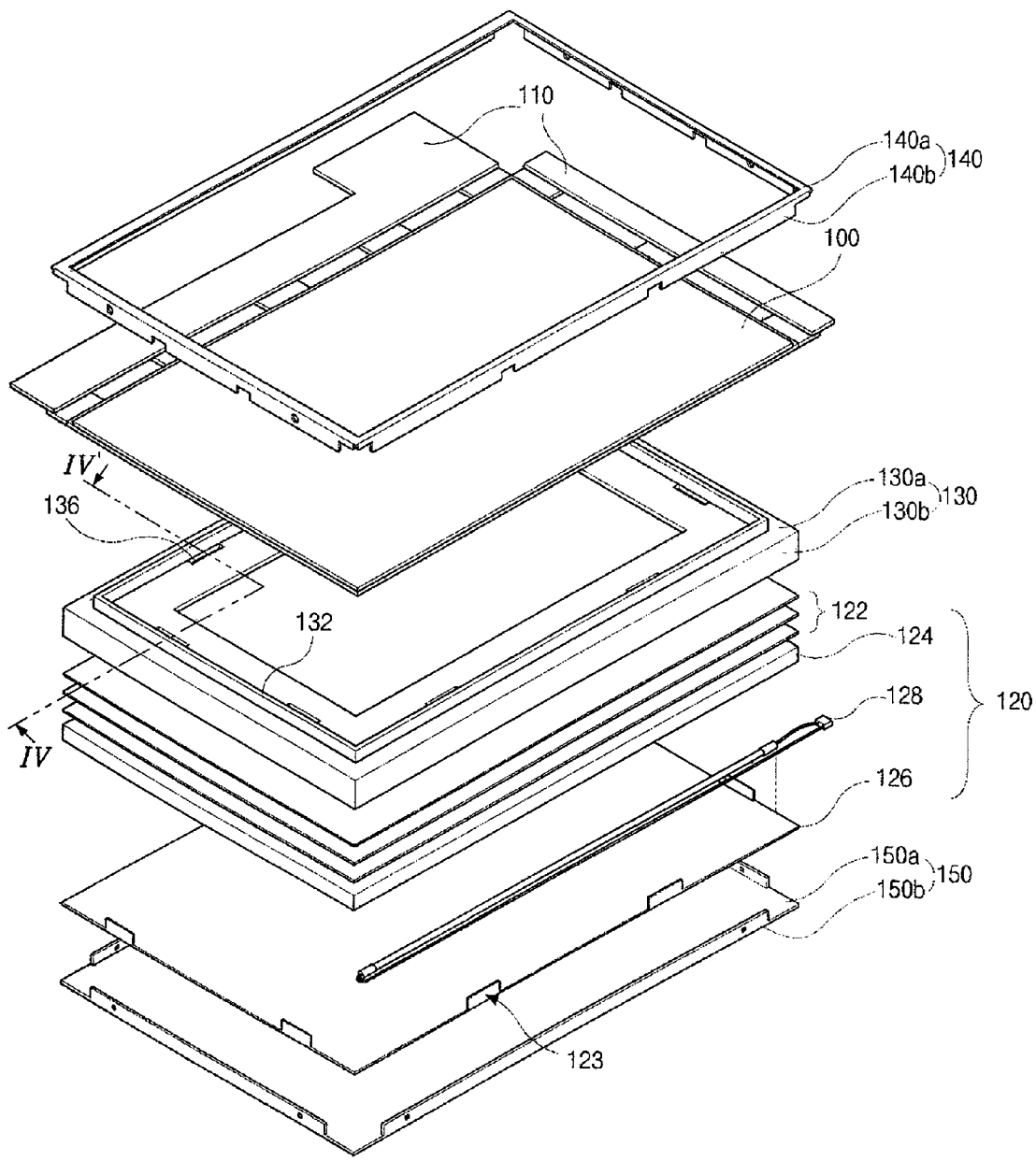
FIG. 3 is an exploded perspective view showing a liquid crystal display module according to an embodiment of the present invention.

FIG. 3 is an exploded perspective view showing a liquid crystal display module according to an embodiment of the present invention.

Figure 2:
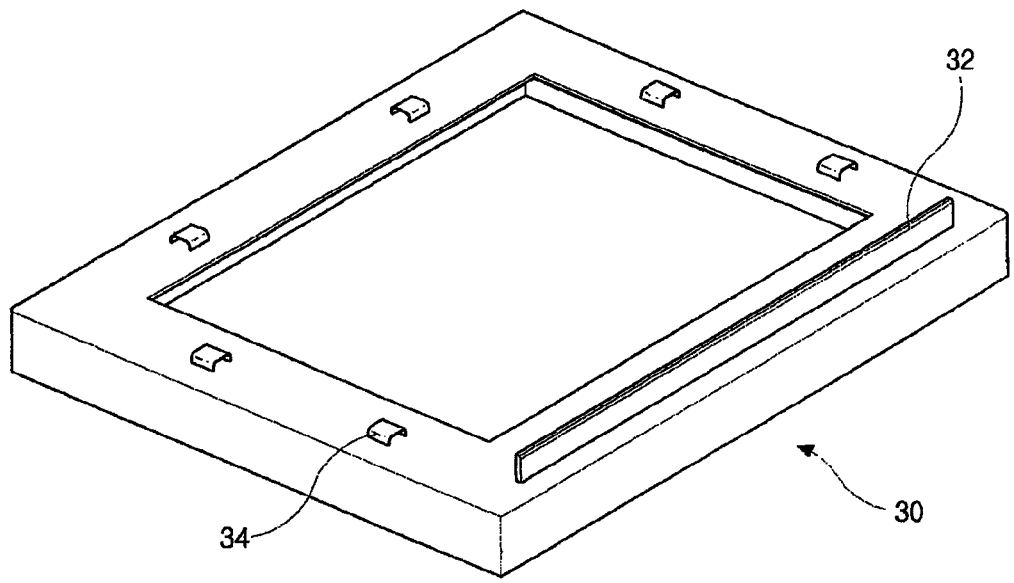
FIG. 2 is a perspective view showing a main frame of a liquid crystal display module according to the related art.

In FIG. 3, a liquid crystal display module includes a liquid crystal display panel 100, a backlight unit 120, a main frame 130, a top frame 140 and a bottom frame 150. Although not shown in FIG. 2, the liquid crystal display panel 100 includes a first substrate, a second substrate facing and spaced apart from the first substrate and a liquid crystal layer between the first and second substrates. A thin film transistor as a switching element is formed on an inner surface of the first substrate and a color filter substrate is formed on an inner surface of the second substrate. Images are displayed in the liquid crystal display panel 100 according to ON/OFF operation of the thin film transistor. A driving unit 110 including a gate driving unit and a data driving unit is connected to the liquid crystal display panel 100 such that the gate driving unit and the data driving unit supply a gate signal and a data signal, respectively, to the liquid crystal display panel 100.

The backlight unit 120 of a side light type is disposed under the liquid crystal display panel 100 and supplies light to the liquid crystal display panel 100. The backlight unit 120 includes a fluorescent lamp 128, a light guide plate 124, a reflecting sheet 126 and a plurality of optical sheets 122. The fluorescent lamp 128 is disposed at one side portion of the bottom frame 150 as a light source, and the reflecting sheet 126 is disposed over the bottom frame 150 to change a light path of light diffused from the fluorescent lamp 128 toward the liquid crystal display panel 100.

The reflecting sheet 126 includes at least one guide terminal 123 corresponding to side surfaces of the liquid crystal display panel 100. The at least one guide terminal 123 is upwardly bent from an edge portion of the reflecting sheet 126. The number of the at least one guide terminal 123 may be varied according to required stability degree. For example, each side of the reflecting sheet 126 may have two guide terminals so that the reflecting sheet 126 can have eight guide terminals. The reflecting sheet 126 and the at least one guide terminal 123 may include an insulating material. For example, the reflecting sheet 126 and the at least one guide terminal 123 may include a synthetic resin film (or a plastic film) and a reflective layer (not shown) having a relatively high reflectance coated on the synthetic resin film.

The light guide plate 124 is disposed over the reflecting sheet 126 such that the fluorescent lamp 128 faces one side surface of the light guide plate 124. The plurality of optical sheets 122 are disposed over the light guide plate 124.

The light from the fluorescent lamp 128 enters the light guide plate 124 through the facing side surface and the light path is changed toward the liquid crystal display panel 100 by the light guide plate 124 and the reflecting sheet 126. While the light passes through the plurality of optical sheets 122, the uniformity of the light is improved. As a result, the uniform light enters the liquid crystal display panel 100.

The main frame 130 having a rectangular shape of a metallic material includes a horizontal portion 130a and a vertical portion 130b perpendicularly bent from the horizontal portion 130a to wrap the liquid crystal display panel 100 and the backlight unit 120. The main frame 130 supports the liquid crystal display panel 100 and the backlight unit 120 to prevent movement of the liquid crystal display panel 100 and the backlight unit 120. In addition, the main frame 130 includes a panel guide 132 upwardly protruding from an upper surface of the horizontal portion 130a of the main frame 130 and corresponding to the liquid crystal display panel 100. Accordingly, the panel guide 132 surrounds side surfaces of the liquid crystal display panel 100 when the liquid crystal display panel 100 and the main frame 130 are combined.

Further, the horizontal portion 130a of the main frame 130 includes at least one through hole 136 corresponding to the at least one guide terminal 123 of the reflecting sheet 126. The at least one through hole 136 is disposed between the panel guide 132 and the liquid crystal display panel 100 when the liquid crystal display panel 100 and the main frame 130 are combined. As a result, when the liquid crystal display panel 100 and the main frame 130 are combined, the at least one guide terminal 123 faces and contacts the side surface of the liquid crystal display panel 100 through the at least one through hole 136.

The top frame 140 has a rectangular ring shape and includes a horizontal portion 140a and a vertical portion 140b perpendicularly bent from the horizontal portion 140a. The horizontal portion 140a covers edge portions of an upper surface of the liquid crystal display panel 100 and the vertical portion 140b covers an outer side surface of the vertical portion 130b of the main frame 130. Accordingly, the top frame 140 is combined with the liquid crystal display panel 100 and the main frame 130 to protect the liquid crystal display panel 100 and the main frame 130. Further, the top frame 140 prevents movement of the liquid crystal display panel 100 and the backlight unit 120 and light leakage from the liquid crystal display module.

The bottom frame 150 includes a horizontal portion 150a and a vertical portion 150b perpendicularly bent from the horizontal portion 150a. The backlight unit 120 is disposed over the horizontal portion 150a of the bottom frame 150 such that the horizontal portion 150a of the bottom frame 150 covers a rear surface of the reflecting sheet 126. The vertical portion 150b covers the at least one guide terminal 123 of the reflecting sheet 126 and a side surface of the backlight unit 120.

As a result, when the main frame 130, the top frame 140 and the bottom frame 150 are combined with the liquid crystal display panel 100 and the backlight unit 120 using a connecting means, the vertical portion 130b of the main frame 130 is disposed between the vertical portion 140b of the top frame 140 and the vertical portion 150b of the bottom frame 150, and the liquid crystal display panel 100 and the backlight unit 120 are disposed in the combined main, top and bottom frames 130, 140 and 150 to form the liquid crystal display module.

In the liquid crystal display module of FIG. 3, the at least one guide terminal 123 of the reflecting sheet 126 upwardly protrudes through the at least one through hole 136 to contact and surround the side surfaces of the liquid crystal display panel 100. Accordingly, the at least one guide terminal 123 aligns the liquid crystal display panel 100 and the backlight unit 120 with the combined main, top and bottom frames 130, 140 and 150 and fixes the liquid crystal display panel 100 and the backlight unit 120 to the combined main, top and bottom frames 130, 140 and 150 without a double-sided adhesive tape. Accordingly, fabrication process for the liquid crystal display module is simplified due to easy alignment step and production cost is reduced due to omission of a double-sided adhesive tape.

In addition, since the at least one guide terminal 123 of an insulating material is disposed between the side surfaces of the liquid crystal display panel 100 and the panel guide 132 of the main frame 130 of a metallic material, the side surfaces of the liquid crystal display panel 100 is insulated and separated from the panel guide 132 of the main frame 130 due to the at least one guide terminal 123. As a result, even when a transparent conductive layer 105 (of FIG. 4) is exposed to an exterior of the liquid crystal display panel 100 of an in-plane switching (IPS) mode, an electric shortage between the panel guide 132 of the main frame 130 and the exposed transparent conductive layer 105 of the liquid crystal display panel 100 is prevented.

Figure 4:
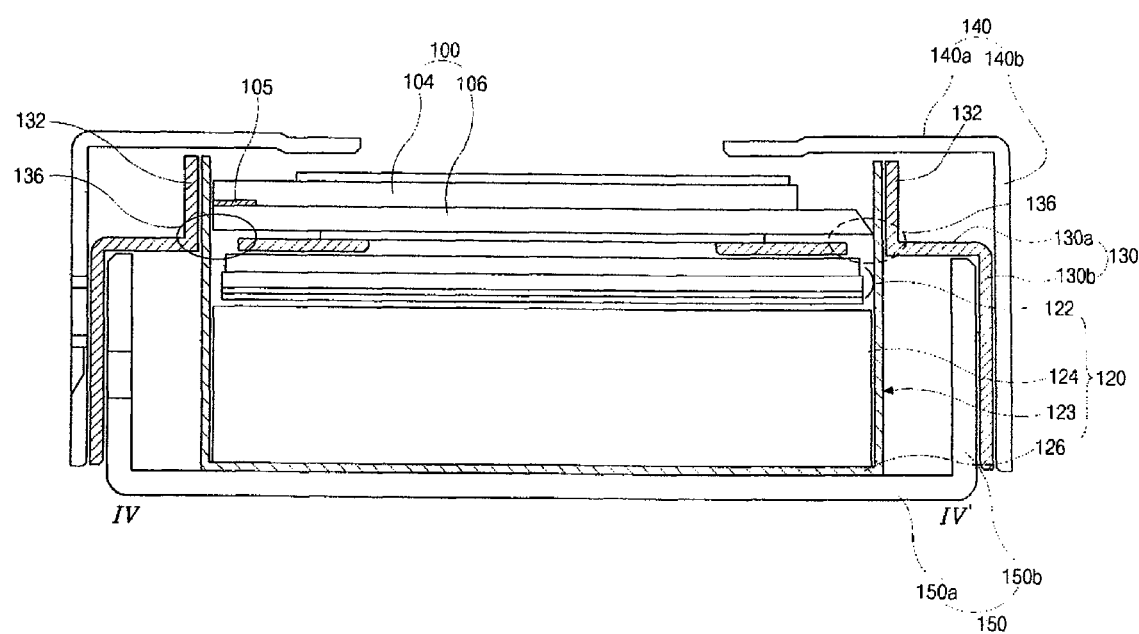
FIG. 4 is a cross-sectional view, which is taken along a line IV-IV' of FIG. 3, showing a liquid crystal display module according to an embodiment of the present invention.

FIG. 4 is a cross-sectional view, which is taken along a line IV-IV' of FIG. 3, showing a liquid crystal display module according to an embodiment of the present invention.

In FIG. 4, the liquid crystal display panel 100 is disposed on an upper surface of the horizontal portion 130a of the main frame 130 and inside the panel guide 132 of the main frame 130. The backlight unit 120 is disposed under the liquid crystal display panel 100 and inside the vertical portion 130b of the main frame 130. Accordingly, the main frame 130 and the bottom frame 150 surround the backlight unit 120 including the fluorescent lamp 128 (of FIG. 3), the reflecting sheet 126, the light guide plate 124 and the plurality of optical sheets 122.

The panel guide 132 upwardly protrudes from the upper surface of the horizontal portion 130a of the main frame 130 to surround the side surfaces of the liquid crystal display panel 100 and the at least one through hole 136. In addition, the at least one through hole 136 is formed in the horizontal portion 130a of the main frame 130 to correspond to the side surfaces of the liquid crystal display panel 100. When the main frame 130, the liquid crystal display panel 100 and the backlight unit 120 are combined, the at least one guide terminal 123 upwardly protruding from the reflecting sheet 126 is inserted through the at least one through hole 136 and contacts the side surfaces of the liquid crystal display panel 100 to support the liquid crystal display panel 100. Since the at least one guide terminal 123 is disposed between the side surfaces of the liquid crystal display panel 100 and the panel guide 132 of the main frame 130, the side surfaces of the liquid crystal display panel 100 is separated and insulated from the panel guide 132. As a result, even when the transparent conductive layer 105 is exposed in the liquid crystal display device of an IPS mode, the electric shortage between the panel guide 132 and the exposed transparent conductive layer 105 is prevented.

Figure 1:
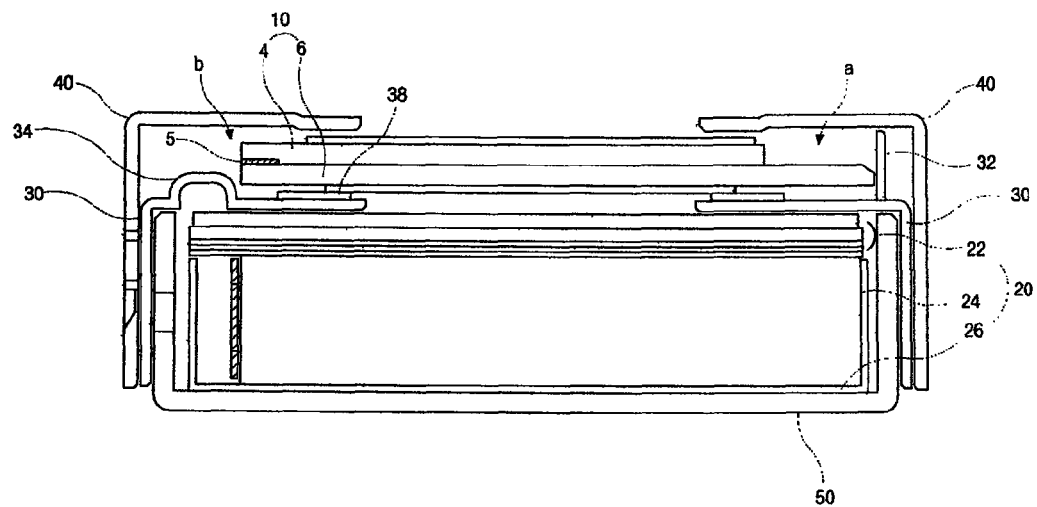
FIG. 1 is a cross-sectional view showing a liquid crystal display module including a side type backlight unit according to the related art.

The at least one guide terminal 123 and the reflecting sheet 126 integrated as a single body may include an insulating material such as a synthetic resin or plastic. Since the at least one guide terminal 123 upwardly protrudes to cover the whole side surfaces of the liquid crystal display panel 100, the liquid crystal display panel 100 is stably supported by the at least one panel guide 123. For example, the end portion of the at least one guide terminal 123 may be higher than the top surface of the liquid crystal display panel 100. As a result, a double-sided adhesive tape 38 (of FIG. 1) between the liquid crystal display panel 100 and the main frame 130 for fixing is omitted.

The at least one guide terminal 123 may be formed by perpendicularly bending an end portion of the reflecting sheet 126. In addition, the number and the width of the at least one guide terminal 123 may be varied in various embodiments. For example, each side of the reflecting sheet 126 may have two guide terminals as shown in FIG. 3, or each side of the reflecting sheet 126 may have one guide terminal having a width corresponding to the length of each side of the reflecting sheet 126. The at least one through hole 136 may have a number and a shape corresponding to the at least one guide terminal 123.

The top frame 140 is disposed over the liquid crystal display panel 100 to cover the upper edge portions of the liquid crystal display panel 100. As a result, the top frame 140, the main frame 130 and the bottom frame 150 are combined to surround and fix the liquid crystal display panel 100 and the backlight unit 120, and the liquid crystal display module is obtained.

Consequently, in the liquid crystal display module according to the present invention, since the main frame and the liquid crystal display panel is separated and insulated by the at least one guide terminal of the reflecting sheet, the electric shortage between the main frame and the liquid crystal display panel is prevented. In addition, since the liquid crystal display panel is fixed by the at least one guide terminal and the main frame, an additional adhesive tape is omitted. As a result, fabrication process for the liquid crystal display module is simplified and production cost for the liquid crystal display module is reduced.

It will be apparent to those skilled in the art that various modifications and variations can be made in a liquid crystal display module and a method of fabricating the liquid crystal display module of the present invention without departing from the spirit or scope of the invention. Thus, it is intended that the present invention cover the modifications and variations of this invention provided they come within the scope of the appended claims and their equivalents.

What is claimed is:

1. A liquid crystal display module, comprising:
a liquid crystal display panel;
a backlight unit under the liquid crystal display panel, the backlight unit having at least one guide terminal facing and contacting side surfaces of the liquid crystal display panel;
a main frame that supports the liquid crystal display panel and the backlight unit;
a bottom frame combined with the main frame to surround the backlight unit; and
a top frame combined with the main frame to cover upper edge portions of the liquid crystal display panel,
wherein the main frame comprises at least one through hole corresponding to the side surfaces of the liquid crystal display panel, and
wherein the at least one guide terminal is inserted through the at least one through hole and a portion of the at least one guide terminal passing through the at least one through hole contacts the liquid crystal display panel.

2. The module according to claim 1, wherein an end portion of the at least one guide terminal is disposed to be higher than a top surface of the liquid crystal display panel.

3. The module according to claim 1, wherein the main frame comprises at least one through hole corresponding to the side surfaces of the liquid crystal display panel.

4. The module according to claim 3, wherein the at least one guide terminal is inserted through the at least one through hole.

5. The module according to claim 1, wherein the backlight unit comprises:
a fluorescent lamp at one side portion of the bottom frame;
a reflecting sheet over the bottom frame;
a light guide plate over the reflecting sheet, a side surface of the light guide plate facing the fluorescent lamp; and
a plurality of optical sheets over the light guide plate,
and wherein the at least one guide terminal is upwardly bent from an edge portion of the reflecting sheet.

6. The module according to claim 5, wherein the main frame includes a metallic material, and the reflecting sheet and the at least one guide terminal include an insulating material.

7. The module according to claim 6, wherein the reflecting sheet and the at least one guide terminal includes a synthetic resin film and a reflective layer on the synthetic resin film.

8. The module according to claim 1, wherein the liquid crystal display panel includes an in-plane switching mode.

9. The module according to claim 1, wherein each of the main, top and bottom frames includes a horizontal portion and a vertical portion.

10. The module according to claim 9, wherein a panel guide protrudes upwardly from the horizontal portion of the main frame, and the horizontal portion of the main frame includes at least one through hole between the panel guide and the liquid crystal display panel.

11. The module according to claim 9, wherein the vertical portion of the main frame is disposed between the vertical portion of the top frame and the vertical portion of the bottom frame.

12. A liquid crystal display module, comprising:
a liquid crystal display panel;
a backlight unit under the liquid crystal display panel, the backlight unit having at least one guide terminal facing and contacting side surfaces of the liquid crystal display panel;
a main frame that supports the liquid crystal display panel and the backlight unit;
a bottom frame combined with the main frame to surround the backlight unit; and
a top frame combined with the main frame to cover upper edge portions of the liquid crystal display panel,
wherein the main frame comprises at least one through hole corresponding to the side surfaces of the liquid crystal display panel,
wherein the at least one guide terminal is inserted through the at least one through hole, and
wherein the main frame comprises a panel guide upwardly protruding and surrounding the liquid crystal display panel and the at least one through hole.

13. The module according to claim 12, wherein the liquid crystal display panel is separated from the panel guide by the at least one guide terminal.

14. A method of fabricating a liquid crystal display module, comprising:
disposing a backlight unit having at least one guide terminal over a bottom frame;
disposing a main frame over the backlight unit, the main frame including at least one through hole;
disposing a liquid crystal display panel over the main frame such that the at least one guide terminal is inserted through the at least one through hole and a portion of the at least one guide terminal passing through the at least one through hole faces and contacts side surfaces of the liquid crystal panel;
disposing a top frame over the liquid crystal display panel; and
combining the bottom frame, the main frame and the top frame to support the liquid crystal panel and the backlight unit.

15. The method according to claim 14, wherein the main frame includes at least one through hole and the at least one guide terminal is inserted through the at least one through hole.

* * * * *